United States Patent
Everitt et al.

(10) Patent No.: US 8,720,283 B2
(45) Date of Patent: May 13, 2014

(54) VARIABLE TORQUE-RATE TEST JOINT

(75) Inventors: Peter William Everitt, Leicestershire (GB); John Edward Burton, West Midlands (GB)

(73) Assignee: Crane Electronics Ltd., Leicestershire (GB)

(*) Notice: Subject to any disclaimer, the term of this patent is extended or adjusted under 35 U.S.C. 154(b) by 24 days.

(21) Appl. No.: 13/574,957

(22) PCT Filed: Jan. 10, 2011

(86) PCT No.: PCT/GB2011/000020
§ 371 (c)(1),
(2), (4) Date: Oct. 10, 2012

(87) PCT Pub. No.: WO2011/089378
PCT Pub. Date: Jul. 28, 2011

(65) Prior Publication Data
US 2013/0036835 A1    Feb. 14, 2013

(30) Foreign Application Priority Data

Jan. 25, 2010  (GB) .................................. 1001141.9

(51) Int. Cl.
*G01L 5/24*   (2006.01)
(52) U.S. Cl.
USPC .................. 73/862.21; 73/862.22; 73/862.26
(58) Field of Classification Search
USPC ............................. 73/862.21–862.22, 862.26
See application file for complete search history.

(56) References Cited

U.S. PATENT DOCUMENTS

| 2,503,649 A | 4/1950 | Zimmerman |
| 3,329,058 A | 7/1967 | Cumming |

(Continued)

FOREIGN PATENT DOCUMENTS

| CN | 10146543 | 6/2009 |
| DE | 102006020325 A1 | 11/2007 |

(Continued)

OTHER PUBLICATIONS

U.S. Appl. No. 13/510,462, filed May 17, 2012, Adrian James Duffin.

*Primary Examiner* — Lisa Caputo
*Assistant Examiner* — Jonathan Dunlap
(74) *Attorney, Agent, or Firm* — Alan G. Towner, Esq.; Pietragallo Gordon Alfano Bosick & Raspanti, LLP

(57) ABSTRACT

The invention provides a variable torque-rate test joint for the performance testing of rotary tools for threaded fasteners. In a typical test routine a nut is repeatedly tightened by the tool and after each tightening the nut must be released and run back to its start position. The invention provides a means for rapidly releasing the pressure on the tightened nut so that it can be run back quickly and easily. The variable joint is supported by a reaction surface that is the operative face of a piston and cylinder assembly seated on a shoulder fast to a shank of the threaded fastener. A hydraulic control is provided for the piston and cylinder assembly including means for hydraulically extending the piston from the cylinder to a fixed maximum extension which defines a test position of the reaction surface, and means for hydraulically retracting the piston back into the cylinder to remove the pressure from the nut at the end of the test. During tightening the piston is extended and preferably hydraulically locked.

17 Claims, 6 Drawing Sheets

(56) References Cited

U.S. PATENT DOCUMENTS

| | | | |
|---|---|---|---|
| 3,815,413 A | 6/1974 | Marshall, III et al. |
| 4,127,788 A | 11/1978 | Daugherty |
| 4,150,559 A | 4/1979 | Levy |
| 4,303,001 A | 12/1981 | Trungold |
| 4,636,120 A | 1/1987 | Brandsberg et al. |
| 5,967,724 A | 10/1999 | Terry |
| 6,202,028 B1 | 3/2001 | Crane et al. |
| 6,237,399 B1 | 5/2001 | Shivaram et al. |
| 6,595,034 B1 * | 7/2003 | Crane et al. | 73/1.12 |
| 6,609,407 B1 | 8/2003 | Tambini |
| 7,428,845 B1 | 9/2008 | Collins |
| 7,458,278 B1 | 12/2008 | Lin |
| 7,640,785 B2 | 1/2010 | Johnson |
| 8,418,569 B2 * | 4/2013 | Everitt et al. | 73/862.21 |
| 8,511,181 B2 * | 8/2013 | Duffin et al. | 73/862.22 |
| 2004/0073384 A1 | 4/2004 | Kadner |
| 2007/0017295 A1 | 1/2007 | Ohta et al. |
| 2009/0265135 A1 | 10/2009 | Hetzel |
| 2010/0132481 A1 | 6/2010 | Everitt et al. |

FOREIGN PATENT DOCUMENTS

| | | |
|---|---|---|
| DE | 102006029556 A1 | 12/2007 |
| EP | 0150964 A2 | 8/1985 |
| EP | 0780661 A1 | 6/1997 |
| GB | 2438874 | 12/2007 |
| JP | 60060525 | 4/1985 |
| JP | 6034464 | 2/1994 |
| JP | 1194662 | 4/1999 |
| JP | 2004101246 | 4/2004 |
| JP | 2006010513 | 1/2006 |
| RU | 2042117 C1 | 8/1995 |
| SU | 1496855 A1 | 7/1989 |
| WO | 9810260 A1 | 3/1998 |
| WO | 2005059496 A1 | 6/2005 |
| WO | 2008099204 A2 | 8/2008 |
| WO | 2011061494 A1 | 5/2011 |
| WO | 2011089378 A1 | 7/2011 |

* cited by examiner

VARIABLE TORQUE-RATE TEST JOINT

CROSS-REFERENCE TO RELATED APPLICATIONS

This application is a U.S. National Stage Application under 35 U.S.C. Section 371 of PCT International Application No. PCT/GB2011/000020, filed Jan. 10, 2011 which claims the benefit of priority application GB 1001141.9, filed Jan. 25, 2010, both of which are incorporated herein by reference as if set forth in their entirety.

FIELD OF THE INVENTION

The invention relates to test joints for the performance testing of rotary tools for threaded fasteners. The invention provides such a test joint with a variable torque-rate.

BACKGROUND OF THE INVENTION

The bolted joint is a very important fastener method in modern engineering assemblies. It works by screwing together two or more parts with a bolt and nut. The bolt or nut may be made integral with one of those parts, and the screwing action draws the bolt and nut together so that their faces produce a clamping force. During clamping the bolt material can stretch or the material forming the parts being fastened together may compress, as the nut is tightened. It is very difficult to measure the precise extent of the above stretching or compression, and therefore to deduce the resulting clamping force. Experiments are therefore performed with force washers to arrive at a torque value which is easy to measure, so as to establish that the clamping force is between specified limits. Once that torque value has been established, it may be replicated as a reliable means of creating a bolted joint (a so-called "test joint") with known characteristics, but to replicate reliably the amount of torque imparted during tightening of a known joint, it becomes essential that the rotary fasteners used to tighten up the test joints are also periodically checked, to make sure they are set up correctly before they are used on an assembly line.

International standards have been set up to specify performance test routines for checking the calibration of rotary tools which are used on assembly lines before fastening bolts and similar threaded fasteners. These performance test methods use Joint Rate Simulators (JRSs). These JRSs simulate the torque pattern that is experienced as a joint is tightened. To a first approximation, as a typical joint is tightened, the torque increases linearly with the angle turned by the screw thread. A JRS uses this characteristic to provide a test piece on which the tool will fit, such that when the tool applies torque to turn the test piece, that torque increases with the angle through which the bolt turns.

The rate of increase of torque with increasing angle is referred to as the torque-rate. A joint with a high torque-rate is referred to as a "hard joint", and full tightening is generally accomplished in a fraction of a revolution. In contrast, in a low torque-rate joint (known as a "soft joint") the full tightening is usually accomplished over a much greater angular range of movement, possibly several complete revolutions of fastener.

Test joints are known in which a rotatable shaft is physically braked, with the braking effort increasing as a function of rotation. The braking effort, which can be achieved either by brake shoes engaging the outer cylindrical surface of the shaft or by brake pads engaging opposite surfaces of a brake disc carried by the shaft, can be varied to simulate either a hard or a soft joint. Our own WO98/10260 is an example of such a variable rate JRS. It allows the test joint parameters to be easily changed, allowing any test joint to be simulated; and it allows the torque to be removed after the joint has been tightened, so that a subsequent cycle of the performance testing routine can take place without any time delay. Any complete performance testing routine comprises a number of repeated tightening cycles of the test joint, with the results being averaged or statistically analyzed. This and other prior JRSs do not, however, have a moment of inertia that is matched to that of the real joint which they are simulating. The moment of inertia of the JRS is invariably greater than, and frequently vastly greater than, that of the real joint.

The disparity between the moment of inertia of the JRS and that of the real joint which it simulates increases when the mechanism for braking the test joint involves calliper brake pads braking against opposite sides of a brake disc. Disparities between the moment of inertia of the test joint and the moment of inertia of the real joint become particularly important when the test joint is used for the performance testing of impulse drive tools. These tools rely on the transfer of pulses of torque, each pulse being a few milliseconds in duration, with many pulses per second being applied to the joint. If the joint has a large moment of inertia, then the tool cannot transfer enough energy to make the joint initially free-turn before the joint tightens, and the tool can then stall. All JRSs with disc brakes suffer from this specific problem, and even JRSs with drum brakes clamping against opposite sides of a shaft can have moments of inertia that are not matched to that of the real joint under simulation, and so will not necessarily give true results for impulse tools.

The invention of our own WO2008/099204 provides a variable torque-rate test joint which has a working moment of inertia that is more closely matched to that of a screw-threaded bolt which it simulates. That compliance between the moment of inertia of the JRS and that of the joint under simulation is achieved by using, for the rotary component of the JRS to be driven by the rotary tool, a screw threaded bolt, the size and inertia of which can be accurately matched with that of the bolt of the joint under simulation.

The test joint according to WO2008/099204 utilizes a screw-threaded nut and bolt on a test rig, the bolt being adapted to be tightened by a rotary tool under test against a variable joint supported by the nut. The variable joint comprises a spring beam which extends in cantilever over a pivot point to engage beneath a head of the bolt. If the pivot point is close to the bolt head then that simulates a hard joint, whereas if the pivot point is more distant from the bolt then the joint becomes progressively more soft. The end of the spring beam remote from the bolt is anchored, either fast to the test rig or fast to the corresponding end of a second spring beam which extends in cantilever past the same pivot point to engage with a nut into which the bolt is screwed. For test purposes the bolt is screwed down against the variable joint, with the applied torque being carefully monitored over the whole angular range of progressive tightening of the bolt. At the end of the tightening process the bolt must be screwed back to its start position and the tightening process is repeated. A typical test sequence would involve a statistically significant number of repeated tightening processes. WO2008/099204 discloses a cam arrangement for the release of the joint compression at the end of each tightening sequence, to permit a rapid run-back of the tightened bolt after each monitored tightening sequence.

The release cams disclosed in WO2008/099204 have proved unsatisfactory when the variable torque-rate test joint simulates a very massive bolt such as may be included in constructional ironwork or in very heavy machinery. Inevitably the cams of WP2008/099204 are sent slightly over-centre to lock the distal ends of the spring beams, so that they do not disengage accidentally. With the heavier duty bolts used in some heavy industries, the pressure of the tightened bolt may be so great that it becomes very difficult or impossible to release those cams at the end of the test sequence, because their release requires the cams to pass once again over-centre to move to their release positions, with an attendant momentary small increase in the pressure applied by the test joint. It is therefore an object of the invention to create a variable torque-rate test joint which has an easily operable release mechanism which is suitable for use over the entire range of test bolt sizes, from small to even the most massive threaded joints.

SUMMARY OF THE INVENTION

The invention provides a variable torque-rate test joint for the performance testing of rotary tools for threaded fasteners, as defined in claim 1 herein.

In the test joint of the invention, it is preferably the nut and not the bolt of the nut and bolt assembly which is adapted to be tightened by the rotary tool under test. A nut has a potentially lower moment of inertia than the screw-threaded shank on which it is screw-threaded, and so the designer has more control over the moment of inertial of the test joint if it is the nut which is engaged and turned by the tool under test.

A variable torque-rate test joint according to the invention can be designed to be suitable for a range of torques and a range of joint rates.

DETAILED DESCRIPTION

Figure 1:
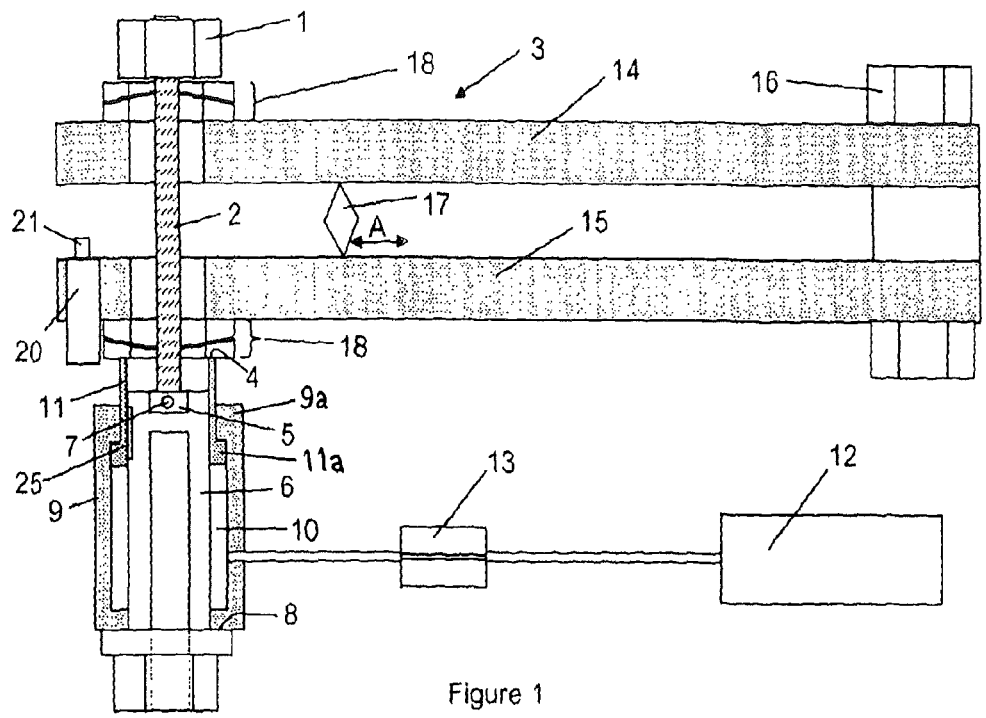
FIG. 1 is a schematic axial section through a variable torque-rate test joint according to the invention in which a nut of a nut and bolt assembly is adapted to be tightened by a rotary tool under test, the components being set ready to commence the test.

Referring first to FIGS. 1 to 4, the variable torque-rate test joint comprises a nut and bolt assembly consisting of a nut 1 screw-threaded to a threaded shaft 2. The nut 1 is the component of the test joint which is adapted to be engaged by and tightened by a rotary tool under test. The tool, not shown in the drawings, engages the hexagonal head of the nut through the intermediary of a torque sensor and tightens the nut on the threaded shaft. The torque sensor enables a precise correlation to be made between the torque applied to the nut 1 and the angular rotation of the nut 1 on the shaft 2, which in turn provides a test regime to calibrating the rotary tool. In a typical test sequence the nut is tightened on the shaft until a maximum torque is applied, then released by unwinding to relieve the pressure, and the whole regime repeated until the user has available the results of several test sequences.

Figure 6:
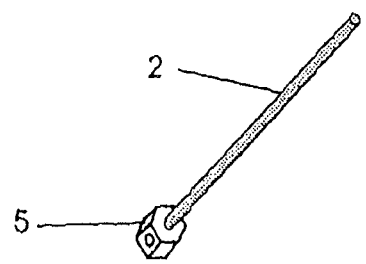
FIG. 6 is a perspective view of the threaded shaft of the screw-threaded nut and bolt assembly of FIGS. 1 to 4.

The nut 1 and shaft 2 are arranged to compress a variable joint 3 against a reaction surface 4, as follows. The threaded shaft 2 has a hexagonal head 5 which is received in a co-operating hexagonal recess in an anchorage member 6. The shaft 2 and head 5 are illustrated more clearly in FIG. 6, which is not drawn to scale. The hexagonal head 5 is shown in FIGS. 1 to 4 as being retained in the recess in the anchorage member 6 by a transverse pin 7 passing through aligned bores in the head and anchorage member 6, although any other retention means may be used in place of the pin 7. The shaft head 5 and the recess in the anchorage member 6 could alternatively be both square, or be any other shapes that co operate to prevent relative rotation between the respective parts. Other means of anchorage of the threaded shaft 2 to the anchorage member 6 are possible. For example a fork or screw cap on the anchorage member 6 could overlie the head 5 of the threaded shaft 2, thus retaining the shaft head 5 in its shaped recess.

At a lower end the anchorage member 6 has a shoulder 8 on which is seated an annular cylinder 9. A hydraulic seal is created between the anchorage member 6 and the cylinder 9 so as to create within the cylinder 9 an annular hydraulic chamber 10 surrounding the anchorage member 6. An alternative to this system would be to use an internal sleeve that provides the hydraulic seal and defines the inner wall of the hydraulic chamber, with anchorage member 6 running through the sleeve.

Figure 2:
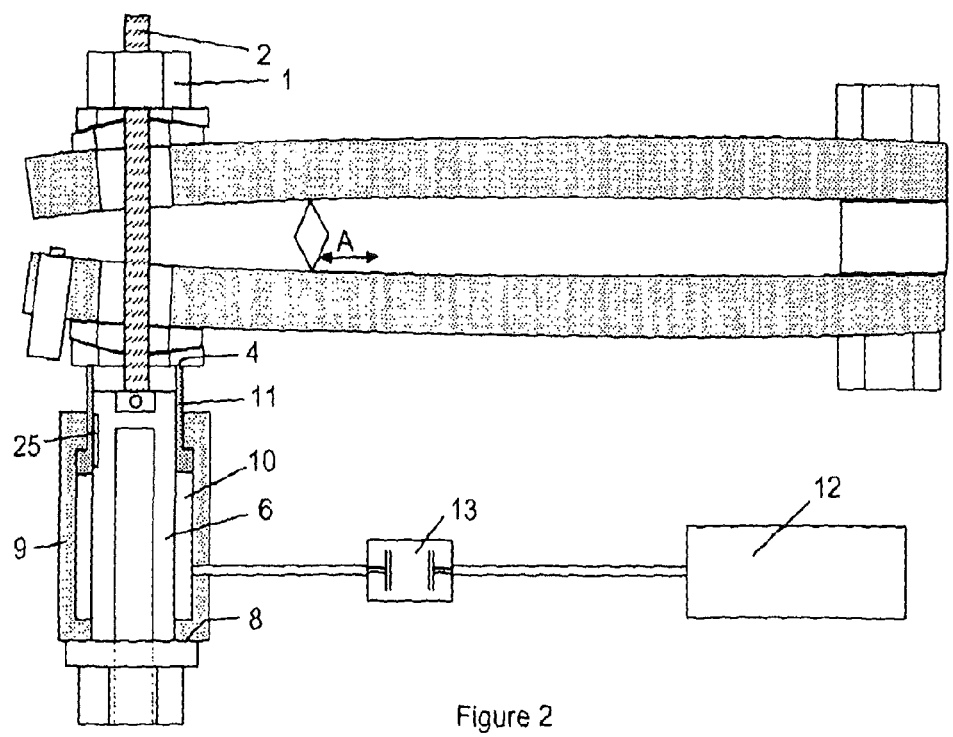
FIG. 2 is a section similar to that of FIG. 1 but showing the test joint at the end of a torque-tightening stage of the test.
Figure 3:
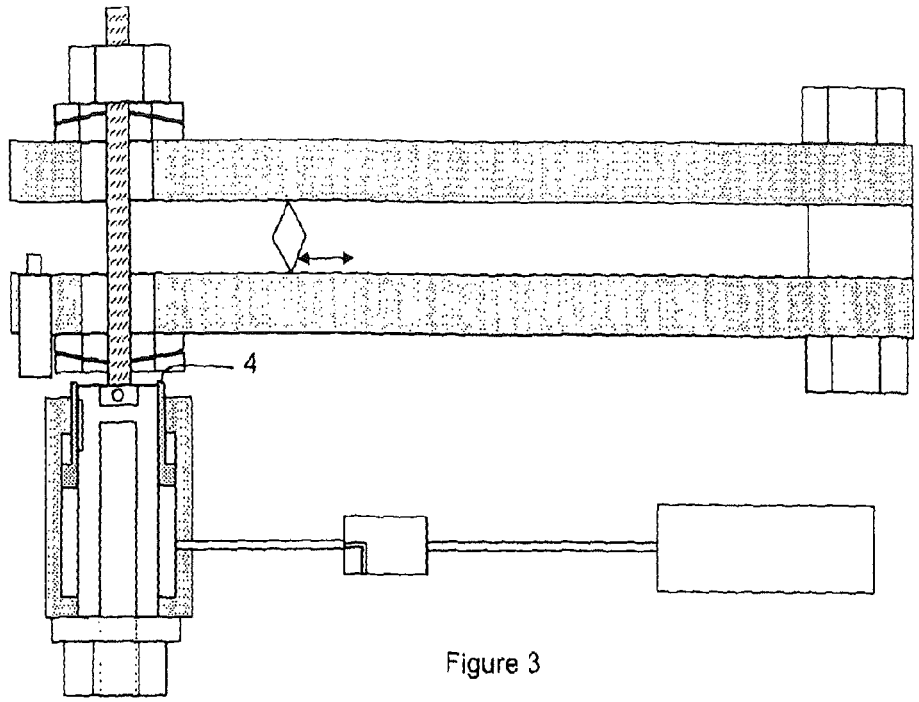
FIG. 3 is a section similar to that of FIGS. 1 and 2 but showing the test joint with the pressure released prior to running back the nut for a subsequent test cycle.
Figure 4:
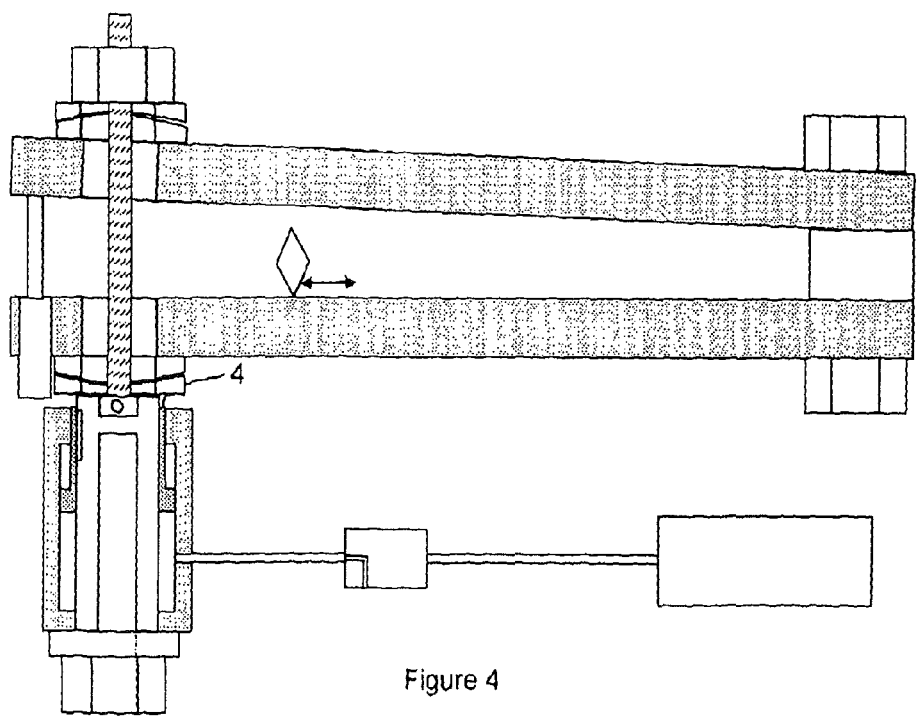
FIG. 4 is a section similar to that of FIGS. 1 to 3 but showing the test joint with an auxiliary piston relieving the pressure on the pivot member.

An annular piston 11 is located at the top end of the cylinder 9. The anchorage member 6 passes axially through aligned bores in the cylinder 9 and piston 11, so that the piston 11 can be extended from the cylinder 9 as shown in FIGS. 1 and 2 or retracted into the cylinder 9 as shown in FIGS. 3 and 4, under the action of hydraulic fluid under pressure from a pressure source 12 and a three-position control valve 13. FIGS. 1 to 3 show the three alternative conditions of the control valve 13. In FIG. 1 the hydraulic supply 12 is activated and the control valve passes hydraulic fluid from the pressure source 12 to the hydraulic chamber 10. In FIG. 2 it is closed against both supply and return of the hydraulic fluid, effectively locking the piston 11 hydraulically against movement relative to the cylinder 9. In FIGS. 3 and 4 the hydraulic chamber 10 is connected to drain, so that the piston 11 is freely movable in the cylinder 9. An alternative to using a three-position valve 13 as illustrated in the drawings would be to use a two-position valve which is either open as in FIG. 1 to connect the hydraulic supply 12 to the hydraulic chamber 10 or closed as in FIG. 2 to isolate the hydraulic chamber 10. The hydraulic 12 supply would be a hydraulic pump which would be operative and the valve 13 open in the set-up configuration of FIG. 1, but the valve closed and the pump inoperative in the test condition of FIG. 2. Instead of the drain position shown in FIGS. 3 and 4 the valve 13 would again be open, but with the pump inoperative, so that the hydraulic fluid in the hydraulic chamber 10 simply passes back to the pump.

Figure 5:
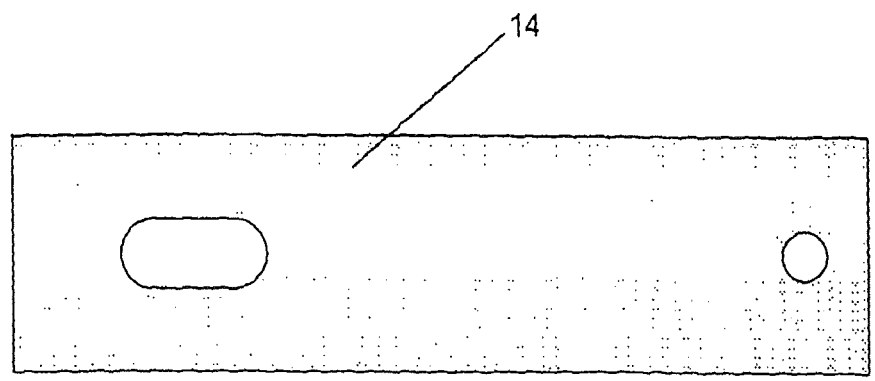
FIG. 5 is a plan view from above of one of the two spring beams used in the test joint of FIGS. 1 to 4.

The top annular edge of the piston 11 forms the reaction surface 4 referred to above, and between the nut and the reaction surface 4 is the variable joint 3. The device 3 comprises a pair of spring beams 14, 15 secured together at one end (the end remote from the nut 1 and threaded shank 2) by a bolt 16. At an intermediate location the beams 14, 15 pass over and under a pivot member 17, so that they extend in cantilever over and under the pivot member 17 to receive the compressive force of the nut 1 and threaded shaft 2. The hardness or softness of the resulting joint is determined by the relative spacing of the pivot member 17 relative to the ends of the spring beams 14, 15. If the pivot member is close to the axis of the threaded shaft 2, then the joint is harder than if it is moved towards the bolt 16. The pivot member itself is movable in the direction of a double-headed arrow A to vary the hardness of the test joint, as will be described later. Each spring beam 14 or 15 has the general outline as shown in FIG. 5. A hole is formed at one end for connection together of the two spring beams 14, 15 by the bolt 16, and an elongate hole at the other end is formed through which the threaded shaft 2 can pass without contact with the side wall of the elongate hole.

When the nut 1 is tightened on the threaded shaft 2 by the tool under test, the spring beams 14, 15 bend as shown in FIG. 2. Twisting of the threaded shaft 2 is avoided or reduced to a minimum by placing two washer pairs 18 between the nut 1 and the beam 14 and between the reaction surface 4 and the beam 15. The washer pairs 18 each comprise a washer with a part-spherical convex surface which seats against a corresponding part-spherical concave surface of the other washer of the pair, so that one part-spherical surface can slide over the other (the washer sets being arranged loosely around the threaded shaft 2). Accordingly, the change in the angular orientation of the ends of the beams 14,15 as the beams flex is not transmitted as a flexing moment to the shaft 2, as illustrated in FIG. 2.

To perform a test sequence, the nut is tightened against the variable joint 3 using the rotary tool under test, and the torque applied to the nut 1 and the angle through which the nut moves is plotted as a graph or table of results. The closeness of that graph or table to the intended performance characteristics of the tool under test provide a measure of accuracy of the torque setting of the tool for a joint of the relevant degree of hardness/softness. However the test must be repeated many times in order to obtain statistically relevant results. Before it can be repeated the nut 1 must be unwound from the shaft 2. Some rotary tools do not have a reverse setting, so that the unwinding of the nut 1 must be performed manually. Other tools have a reverse setting, but that may not develop the necessary torque to unwind the nut after it has been tightened to the desired high torque setting. The test joint of the invention therefore incorporates means for relieving the pressure on the beams 14, 15 hydraulically. The control valve is set to the pressure relief condition of FIG. 3, and the piston 11 immediately retracts, relieving all of the applied pressure. The nut 1 can then be wound back easily either by hand, by the tool under test or by rotating the anchorage member 6 for example by an electric motor. The pressure on the joint has been released even before this winding back commences, and the return to the condition of FIG. 1 is achieved swiftly and with a minimum expenditure of energy. It should be understood that the anchorage member 6 must be held against rotation during the test sequence while the nut 1 is being tightened by the tool under test, so that if the winding back at the end of the test is to be obtained by turning the anchorage member (which is shown as having a hexagonal head beneath the cylinder 9), then there must be a ratchet or similar anchorage (not shown) to allow that turning of the anchorage member during the winding back sequence but holding it against rotation during the test sequence. Otherwise, the anchorage member 6 would have to be clamped against rotation at all times.

It will be observed when comparing FIGS. 3 and 1 that the piston 11 has an out-turned shoulder 11a which is aligned with an in-turned shoulder 9a of the cylinder 9. When the shoulders engage each other, that engagement defines the maximum extension of the piston from the cylinder. It is that maximum extension which defines a test position of the reaction surface 4, being exactly the same for all tests in the series.

FIGS. 1 to 4 also show an optional modification to the test joint as described above. A cylinder 20 is mounted at the left-hand end of the beam 15 as illustrated, immediately adjacent the threaded shaft 2. A piston 21 can be hydraulically or pneumatically extended from that cylinder as shown in FIG. 4 when the test joint has been returned to its initial position. FIG. 4 shows in a very exaggerated fashion the result of that extension. The top beam 14 is lifted away from the pivot member 17, which makes it significantly easier for the pivot member 17 to be moved in the direction of the arrow A to vary the hardness of the simulated joint.

FIGS. 1 to 4 also show another optional modification which greatly extends the usefulness of the test joint as so far described. Built in to the anchorage member 6 is a strain gauge 25. That measures the actual linear strain in the anchorage member, which is a direct measure of the compressive force created by the rotary tool under test when used on the test joint. A torque gauge between the rotary tool and the nut 1 will measure both the torque and the angular rotation for each torque output. Without the strain gauge 25 however the actual compressive force of the joint would have to be calculated from the applied torque or the amount of angular rotation. Using the strain gauge 25 that calculation is redundant or in the alternative its accuracy can be checked directly, which is a great benefit in tool calibration and tool performance assessment.

Instead of using a strain gauge 25, an alternative procedure can be used for determining the compressive force in the test joint based on a measurement of the deflection of the beams 14,15. A measurement of the distance between the upper and lower beams as they bend under compression determines the extent through which they have moved from their rest positions. The properties of the beams are well known so from their deflection it is straightforward to calculate the compressive force exerted on them and the equal reactive force that they exert on the test joint. The distance measurement can in principle be made at any location along the beams between the pivot 17 and their free ends but the preferred location is close to the threaded shaft 2, where the compressive force is applied to the beams. One simple way to determine the distance through which the beams 14,15 have been deflected is to use the aforementioned torque gauge between the rotary tool under test and the nut 1 to measure the angular rotation of the nut. Multiplying the number of turns of the nut by the pitch of its thread gives a measure of the distance through which the beams have moved under the compressive force of the test joint.

Figure 7:
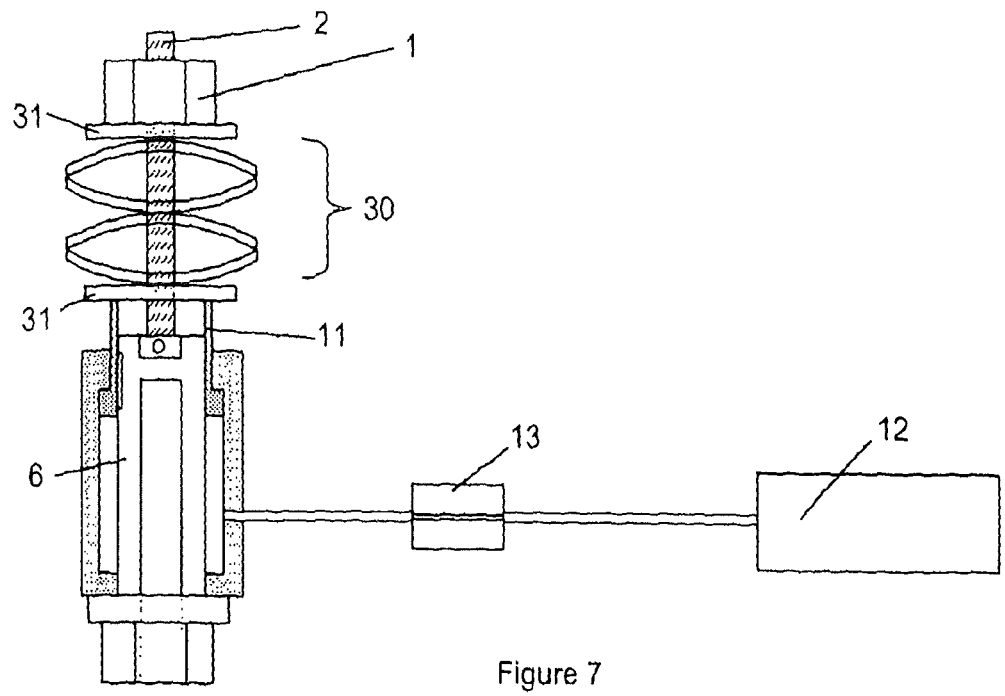
FIGS. 7 to 9 are sections similar to those of FIGS. 1 to 3 respectively through another a variable torque-rate test joint according to the invention in which the variable joint is a stack of Belleville washers.
Figure 7A:
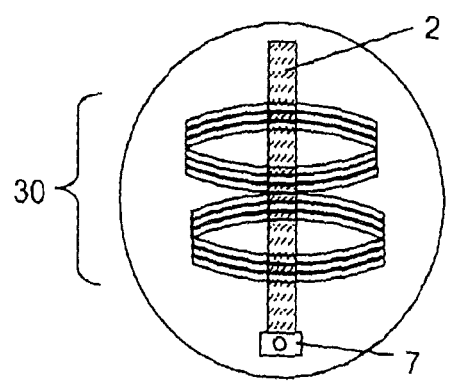
Figure 7B:
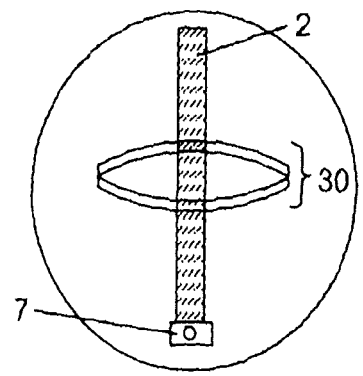
Figure 8:
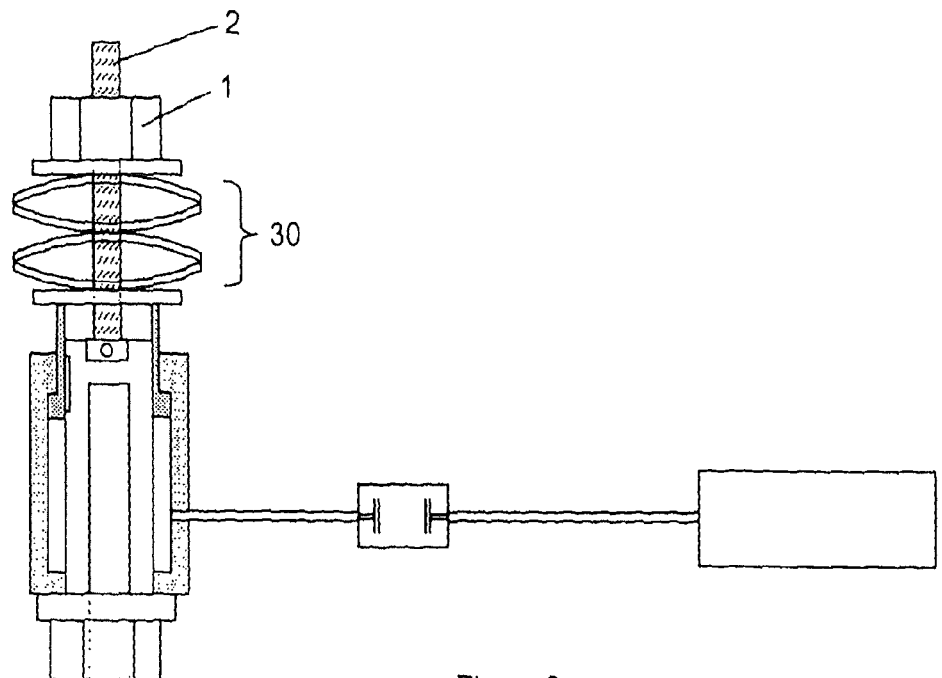
Figure 9:
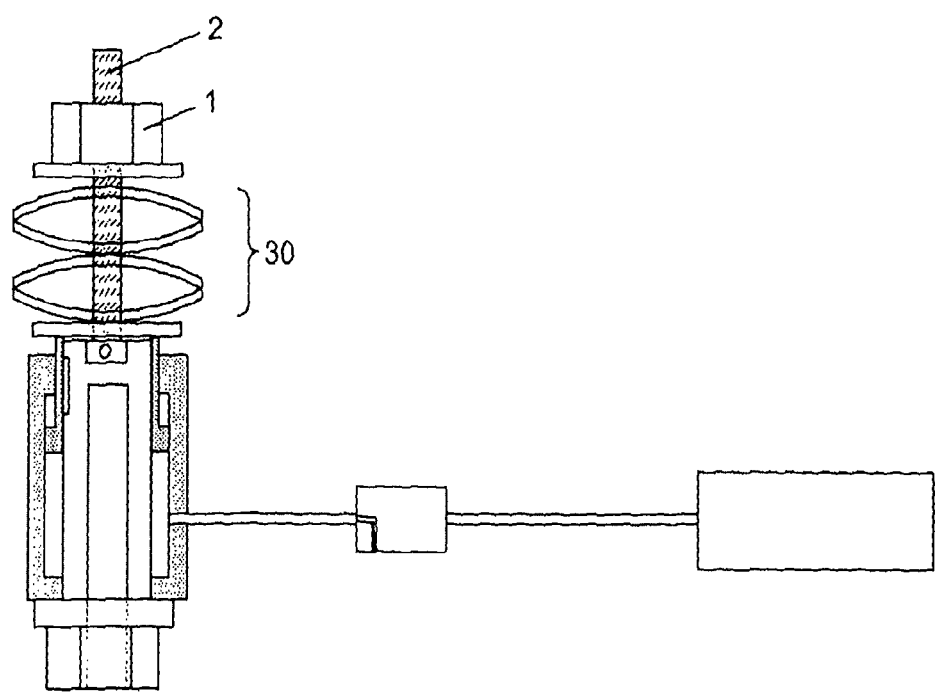

FIGS. 7 to 9 illustrate another variable torque-rate test joint according to the invention. The nut 1, threaded shaft 2 and hydraulic cylinder 9 to control the reaction surface 4 against which the variable joint is compressed are all as described in relation to FIGS. 1 to 3, so further description is not necessary here. Where FIGS. 7 to 9 differ from FIGS. 1 to 3 is that instead of the two beams 14, 15 of FIGS. 1 to 3, the test joint of FIGS. 7 to 9 utilizes a stack of Belleville washers 30 between two flat washers 31 to create the variable joint. The change from a hard joint to a soft joint can be adjusted by varying the number and disposition of the washers in the stack as shown in the inset FIGS. 7A and 7B. Of course, there is no piston 21 and cylinder 20 in the embodiment of FIGS. 7 to 9 as there was in FIGS. 1 to 4, since there is no pivot member 17 to move as part of securing that adjustment of the hardness of the simulated joint. The additional strain gauge 25 is, however an optional addition to the test joint of FIGS. 7 to 9 just as it was with the embodiment of FIGS. 1 to 4.

In place of the stack of Belleville washers of FIGS. 7 to 9 there may be used any other compressible material, the joint-rate being determined by the nature and thickness of the compressible material.

Figure 10:
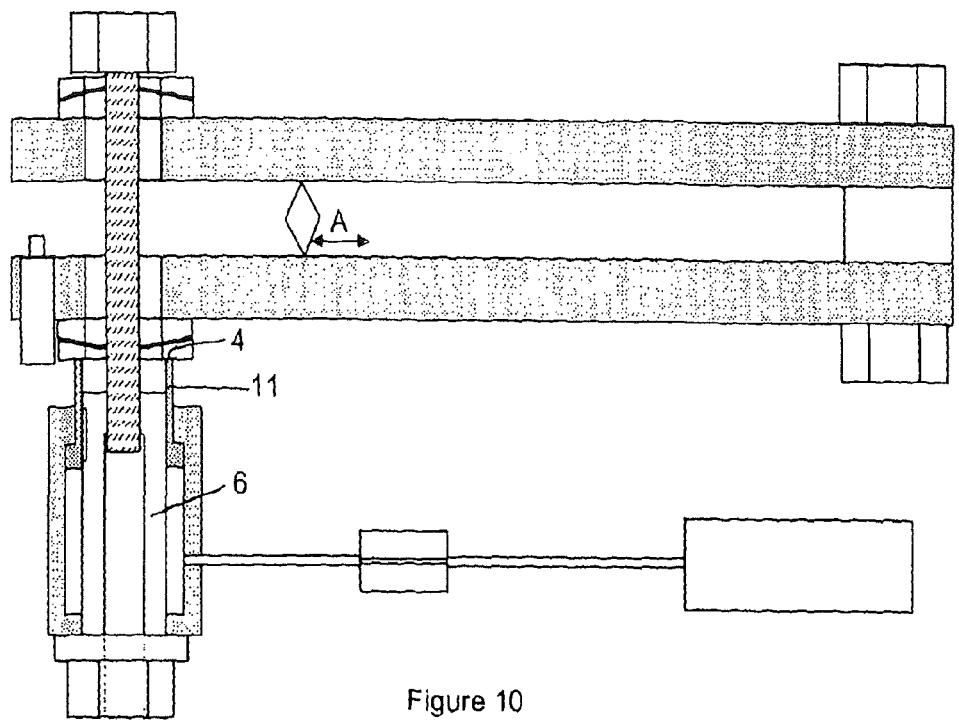
FIGS. 10 and 11 are sections similar to those of FIGS. 1 and 7 respectively through further embodiments of variable torque-rate test joints according to the invention in which in each case a bolt (rather than the nut) of a nut and bolt assembly is adapted to be turned by a rotary tool under test.
Figure 11:
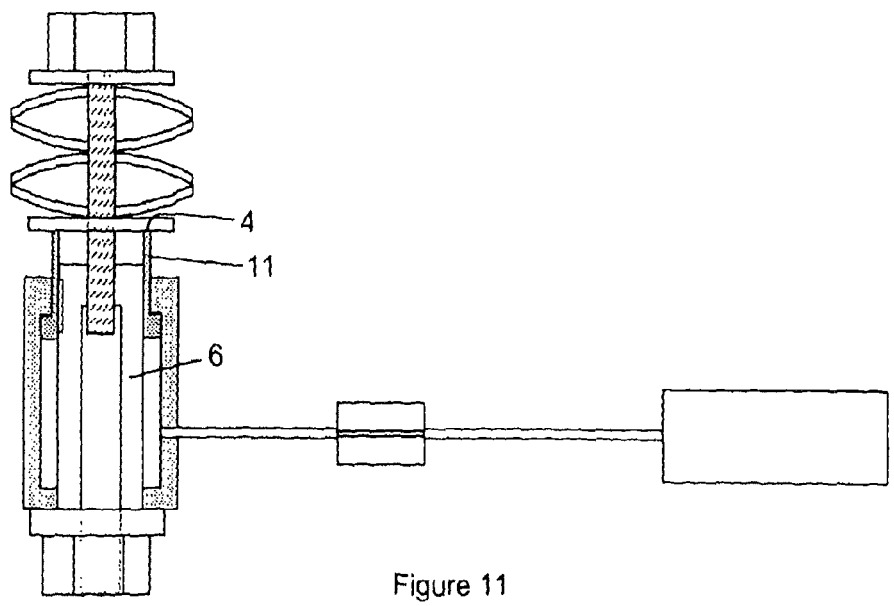

FIG. 10 shows a variant of FIG. 1, in which the rotary tool under test turns a bolt rather than a nut of the threaded nut and bolt assembly. The bolt head is a hexagonal head which is engaged by the tool under test. In place of the corresponding nut is a screw-threaded bore in the anchorage member 6, so that turning of the bolt causes the anchorage member 6 to rise up the threaded shaft of the bolt. FIG. 11 shows a corresponding modification of the test joint of FIG. 7. In both FIGS. 10 and 11 the reaction surface 4 against which the variable joint is compressed is the same top annular surface of the piston as in FIGS. 1 and 7.

Whereas particular embodiments of this invention have been described above for purposes of illustration, it will be evident to those skilled in the art that numerous variations of the details of the present invention may be made without departing from the invention as defined in the appended claims.

The invention claimed is:

1. A variable torque-rate test joint for performance testing of rotary tools for threaded fasteners, comprising a screw-threaded nut and bolt assembly in a test rig, the assembly being adapted to be tightened by a rotary tool under test to compress a variable joint against a reaction surface of the test rig,
   characterized in that the reaction surface is an operative face of a hydraulic piston and cylinder assembly, and a hydraulic control is provided for the piston and cylinder assembly, including
   means for hydraulically extending the piston from the cylinder to an extended condition which defines a test position of the reaction surface, and
   means for hydraulically retracting the piston back into the cylinder to remove pressure on the reaction surface at the end of the test, to facilitate unwinding of the test joint for a subsequent test.

2. A variable torque-rate test joint according to claim 1, wherein the hydraulic control further comprises means for hydraulically locking the piston at its extended condition for the duration of the test.

3. A variable torque-rate test joint according to claim 1, wherein the nut and bolt assembly comprises a screw-threaded nut on a screw-threaded shank that is mounted in the test rig, the nut being adapted to be turned and tightened by the tool under test.

4. A variable torque-rate test joint according to claim 3, wherein the screw-threaded shank is secured to an end portion of an anchorage member which extends through the piston and cylinder assembly from a reaction shoulder adjacent one end of the anchorage member which provides a seat for the piston and cylinder assembly to the said end portion of the anchorage member at an opposite end thereof.

5. A variable torque-rate test joint according to claim 4, wherein the screw-threaded shank is secured to the end portion of the anchorage member by having a non-circular head of the screw-threaded shank being retained in a co-operating recess in the said end portion.

6. A variable torque-rate test joint according to claim 5, wherein the securing of the head of the screw-threaded shank is achieved by a pin extending laterally through aligned bores in the end portion of the anchorage member and the head of the screw-threaded shank.

7. A variable torque-rate test joint according to claim 1, wherein the nut and bolt assembly comprises a screw-threaded bolt that is adapted to be screwed into an end portion of a screw-threaded anchorage member that is mounted in the test rig, the bolt having a bolt head that is adapted to be turned by the tool under test and the anchorage member extending through the piston and cylinder assembly from a reaction shoulder adjacent one end of the anchorage member which provides a seat for the piston and cylinder assembly to the said end portion of the anchorage member at an opposite end thereof.

8. A variable torque-rate test joint according to claim 5, wherein the non-circular head of the screw-threaded shank is hexagonal in shape.

9. A variable torque-rate test joint according to claim 4, further comprising a strain gauge built into the anchorage member.

10. A variable torque-rate test joint according to claim 1, wherein the variable joint is a stack of Belleville washers or compressible material.

11. A variable torque-rate test joint according to claim 1, wherein the variable joint is a pair of spring beams extending from a proximal location between the nut and bolt assembly and the reaction surface, in cantilever over a pivot member to a distal location at which they are secured together.

12. A variable torque-rate test joint according to claim 11, wherein the torque-rate of the variable joint is variable by moving the pivot member towards or away from the screw axis of the nut and bolt assembly.

13. A variable torque-rate test joint according to claim 12, further comprising a piston between the spring beams, the piston being capable of being actuated to lift at least one of the beams away from the pivot member to facilitate the movement of the pivot member towards or away from the screw axis.

14. A variable torque-rate test joint according to claim 11, wherein a first angularly adjustable washer set is provided between the nut and bolt assembly and one of the pair of spring beams, and a second angularly adjustable washer set is provided between the reaction surface of the test rig and the other of the pair of spring beams.

15. A variable torque-rate test joint according to claim 14, wherein each angularly adjustable washer set comprises a pair of washers one of which has a part-spherical convex surface which seats against a corresponding part-spherical concave surface of the other, the washers of each washer set fitting loosely around the nut and bolt assembly to permit sliding of the said one washer of the washer set relative to the other.

16. A variable torque-rate test joint according to claim 11, further comprising means for measuring the deflection of the beams to determine compressive force applied to the beams.

17. A variable torque-rate test joint according to claim 16, wherein the means for measuring the deflection of the beams measures the relative angular rotation of the nut and the bolt, from which can be determined a distance travelled along a pitch of the screw-threaded connection between the nut and bolt.

* * * * *